F. STEBLER.
FRUIT CLEANING MACHINE.
APPLICATION FILED MAY 13, 1918.

1,296,131.

Patented Mar. 4, 1919.
3 SHEETS—SHEET 3.

Witnesses:
Sully Russo
Little A. Alter

Inventor
Fred Stebler
By Frederick P. Lyon
atty

UNITED STATES PATENT OFFICE.

FRED STEBLER, OF RIVERSIDE, CALIFORNIA.

FRUIT-CLEANING MACHINE.

1,296,131.     Specification of Letters Patent.     Patented Mar. 4, 1919.

Application filed May 13, 1918. Serial No. 234,053.

*To all whom it may concern:*

Be it known that I, FRED STEBLER, a citizen of the United States, residing at Riverside, in the county of Riverside and State of California, have invented a new and useful Fruit-Cleaning Machine, of which the following is a specification.

This invention relates to machines designed for cleaning fruit and an object of the invention is to clean the fruit as perfectly as possible so that it will present a good appearance when marketed. The machine is useful in cleaning citrus fruits such as oranges and lemons, and is particularly applicable to the cleaning of oblong fruits such as lemons.

Another object is to provide a construction whereby oblong fruit bodies will not be turned in various directions continuously but will be turned only in one direction and be brought against stationary brushes at their opposite ends alternately while in contact with revolving brushes so as to scrub the dirt from the fruit skins.

Other objects and advantages will appear in the subjoined detail description.

The accompanying drawings illustrate the invention:

Figure 1:
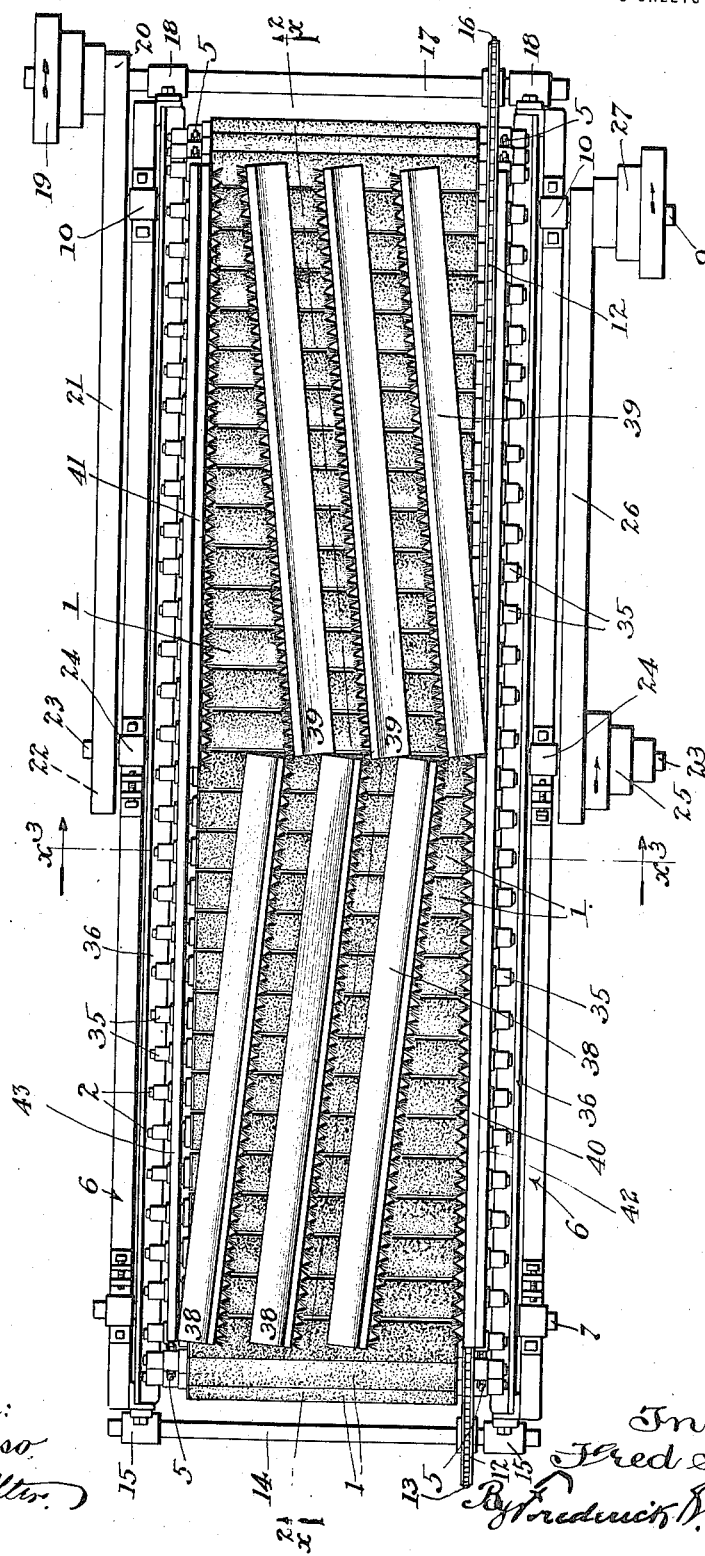
Figure 1 is a plan view of a fruit cleaning machine constructed in accordance with the provisions of this invention, the nozzles and pipes being omitted.

There is provided a fruit-supporting and conveying surface comprising a series of rotatively mounted members which in this instance are in the form of brushes 1 of circular cross section. The adjacent brushes are spaced slightly from one another so as not to touch one another but are sufficiently close to one another to prevent fruit from falling between them. The ends of the brushes 1 are provided with shafts 2 journaled in bearings 3 that form portions of endless conveyer chains 4 which are rove around sprocket wheels 5, said sprocket wheels being arranged in pairs at opposite ends of a suitable frame 6. The sprocket wheels 5 of one pair are mounted on a shaft 7 which is journaled in bearings 8 mounted on the frame 6; and the sprocket wheels 5 of the other pair are mounted on a shaft 9 which is journaled in bearings 10 mounted on the frame. The bearing 8 is preferably adjustable as shown so that the conveyer chains can be kept at suitable tension.

On the shafts 2 at one end of the brushes are fixed sprocket wheels 11 engaging an endless chain 12 which is rove around a sprocket wheel 13 mounted on a shaft 14 that rotates in bearings 15 at one end of the frame 6. The chain 12 is also rove around a sprocket wheel 16 fast on a shaft 17 which is journaled in bearings 18 mounted on the other end of said frame. The shaft 17 may be driven by a stepped pulley 19 fixed thereon and adapted to be belted to any suitable source of power. The shaft 17 is also provided with another pulley 20 connected by a belt 21 to a pulley 22 on a shaft 23 which is journaled in bearings 24 substantially midway of the ends of the frame. The shaft 23 is provided with a stepped pulley 25 engaged by a belt 26 which engages another stepped pulley 27 on the shaft 9.

Thus it is seen that driving the pulley 19 causes progressive movement of the conveyer brushes 1 and also causes rotation of said brushes. In the instance shown in the drawings the conveyer is mounted in an inclined position, the fruit being fed to the lower end from a chute 28 and being discharged onto a chute 29 at the upper end. While the fruit is being conveyed by the conveyer it may be sprayed with water from suitable nozzles 30 extending transversely of the frame at intervals therealong, one end of said nozzles being connected with supply pipes 31. The nozzles 30 are arranged in two series, the upper series being above the level of the upper run of the conveyer and the lower series being below the upper run of the conveyer and above the lower run of said conveyer. Beneath the upper run of the conveyer and above the lower series of nozzles 30 is arranged a drainage pan 32 to catch the water draining from the fruit and from the brushes of the upper run of the conveyer. Beneath the lower run of the conveyer is a drainage pan 33 having a drain pipe 34 at its lower end, said pan being aslant so that the water will drain into the drain pipe 34.

The outer end of the shafts 2 may be provided with rollers 35 to run on tracks 36 extending lengthwise along the sides of the frame. The tracks 36 in the instance shown are formed of angles, and extending aslant downward and inward from said angles are deflecting plates 37 adapted to prevent splashing of water outward from the sides of the machine during operation of the machine.

Extending transversely to the brushes 1 immediately above said brushes are two series of stationary brushes 38, 39. The brushes 38 extend from the intake end of the machine aslant toward one side of the machine to the middle portion of the machine, and the brushes 39 extend from the middle portion aslant toward the opposite side of the machine to the discharge end. This gives lateral motion to the fruit as it is being conveyed, and also adds to the cleaning function in that the ends of the fruit that might otherwise not come in contact with the brushes 38, 39, 40, 41 are brought against these brushes and are thereby cleaned. Along the sides of the machine are provided brushes 40, 41, respectively to aid in cleaning the fruit and to prevent bruising the fruit against the sides 42, 43 of the frame.

Figure 3:
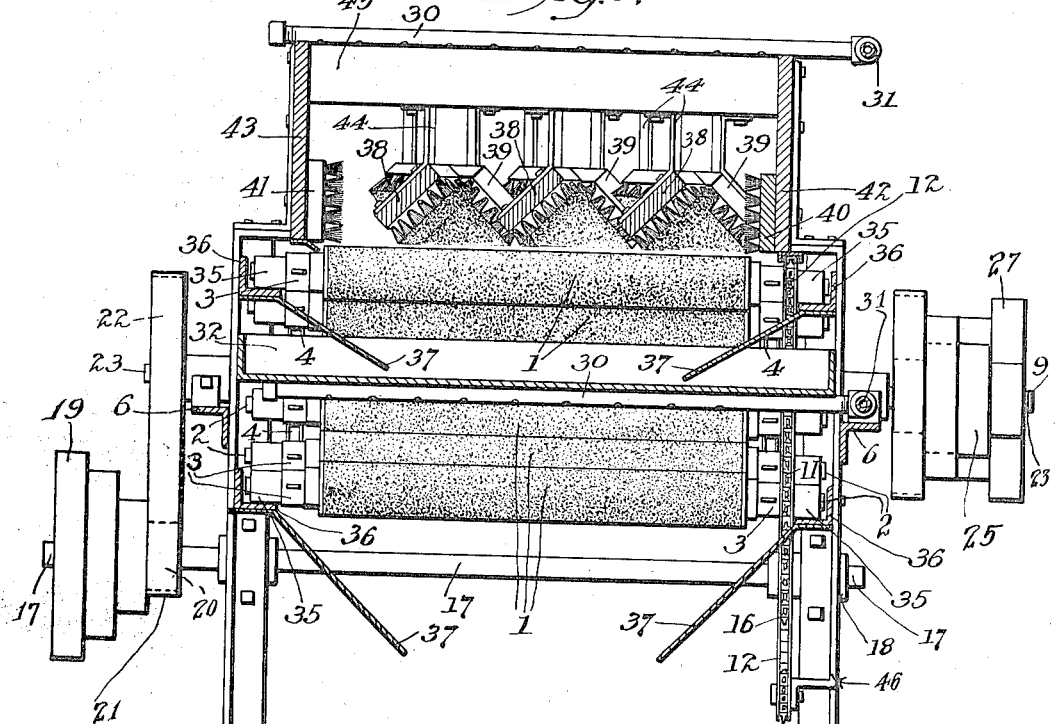
Fig. 3 is an enlarged cross section on line indicated by $x^3-x^3$, Fig. 1.
Figure 4:
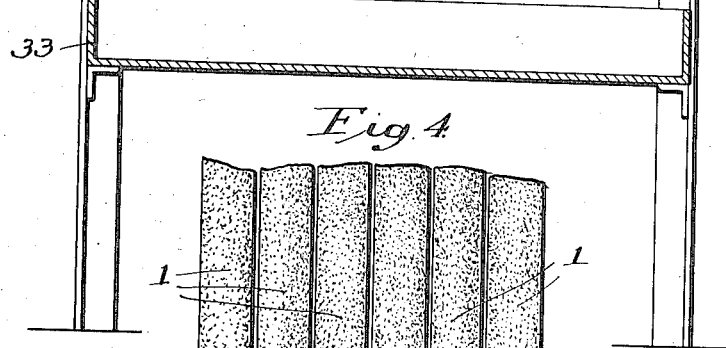
Fig. 4 is a fragmental view of the conveyer.

The brushes 38, 39 may be arranged transversely aslant to the vertical, as clearly shown in Fig. 3 so that the fruit will be carried beneath the brushes by the conveyer.

In practical operation power will be applied to the pulley 19 to drive the conveyer and to rotate the brushes 1 as hereinbefore provided for by the driving connections described, and water will be supplied to the pipes 31, if the fruit is to be washed.

Figure 2:
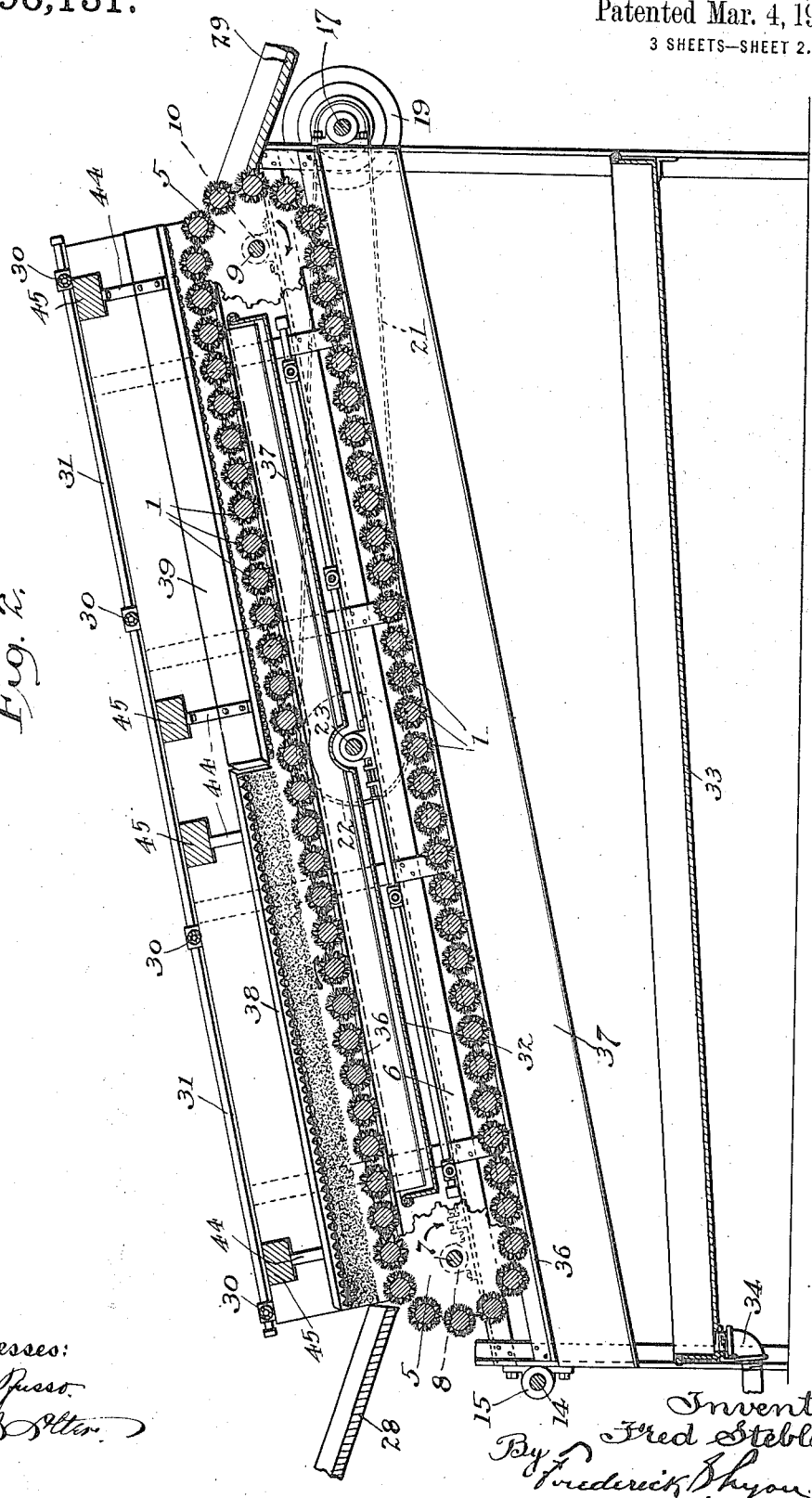
Fig. 2 is a longitudinal sectional elevation on the irregular line indicated by $x^2-x^2$, Fig. 1.

The fruit will be fed to the conveyer at the lower end thereof from the chute 28 and said fruit will be carried by the conveyer between each two adjacent brushes 38 and between one of the brushes 38 and the brush 40, thus causing the fruit to pass in rows or files toward the discharge end of the machine. The brushes 1 are caused to rotate in a clockwise direction in Fig. 2 and this causes rotation of the fruit bodies while they are being conveyed and, since the brushes 38 are set aslant to the longitudinal axis and since the tendency of the conveyer is to convey the fruit in lines parallel with said longitudinal axis, the fruit bodies rotate against the brushes 38 and are gradually forced laterally by said brushes 38 toward one side of the machine, the right-hand side in Fig. 3. The fruit bodies are thus scrubbed as they pass along the brushes 38. When the fruit reaches the ends of the brushes 38 it discharges between adjacent brushes 39 and between one of the brushes 39 and the brush 41 and owing to said brushes 39 being set aslant in a direction opposite to the slant of the brushes 38 the fruit will be impelled toward the left-hand side of the machine and will finally discharge from the conveyer onto the chute 29.

Owing to the brushes 38, 39 being set aslant to the vertical it is clear that the space between each of the brushes and the rotative brushes 1 is wedge shaped in cross section and thus the fruit bodies will be held by the brushes 38, 39 downward toward the brushes 1 and the fruit will not bound off of said brushes 1. This maximizes the scrubbing effect and yet the fruit is not injured by the slight pressure engendered by the arrangement of the brushes 38, 39 as above described.

It is to be understood that in some instances it may be desirable to dry-clean the fruit, that in such event the nozzles 30 and supply pipe 31 may be omitted, and that the invention also includes the described construction omitting the nozzles and supply pipes.

Changes may be made in the above particularly described construction in so far as such changes lie within the spirit and scope of the invention as defined in the appended claims.

The brushes 38, 39 are supported by brackets 44 fastened to cross bars 45 of the frame 6. A belt tightener 46 of any suitable construction may be provided for the chain 12.

I claim:

1. A fruit cleaning machine comprising a frame, fruit-supporting and conveying means including rotary brushes, and brushes extending longitudinally side by side in parallel lines from one end of the machine toward one side thereof above the conveying means and forming a passage therebetween for the fruit, said last named brushes being set aslant to the longitudinal axis of the machine so as to guide the fruit toward one side of the machine.

2. A fruit cleaning machine comprising a frame, fruit-supporting and conveying means including rotary brushes, and stationarily mounted brushes extending longitudinally side by side in parallel lines from one end of the machine toward one side thereof above the conveying means and forming a passage therebetween for the fruit, said last named brushes being set aslant to the longitudinal axis of the machine so as to guide the fruit toward one side of the machine.

3. A fruit cleaning machine comprising a frame, fruit-supporting and conveying means including rotary brushes, and brushes extending longitudinally side by side above the conveying means and arranged in two series, the brushes of one series being set aslant in parallel lines from one end of the machine toward one side thereof to guide the fruit toward one side of the machine and the brushes of the other series being set aslant in parallel lines from adjacent the ends of the first series toward the opposite side of the machine to guide the fruit toward the opposite side of the machine.

4. A fruit cleaning machine comprising a frame, fruit-supporting and conveying means including rotary brushes, and stationarily mounted brushes extending longitudinally side by side above the conveying means and arranged in two series, the brushes of one series being set aslant in parallel lines from one end of the machine toward one side thereof to guide the fruit toward one side of the machine and the brushes of the other series being set aslant in parallel lines from adjacent the ends of the first series toward the opposite side of the machine to guide the fruit toward the opposite side of the machine.

5. A fruit cleaning machine comprising a frame, rotary fruit-supporting members mounted on the frame, means to rotate the fruit-supporting members, means to move the fruit-supporting members along the frame, and brushes extending longitudnally above the fruit-supporting members and forming a passage therebetween for the fruit, said brushes being set aslant to the longitudinal axis of the machine so as to guide the fruit toward one side of the machine.

6. A fruit cleaning machine comprising a frame, rotary fruit-supporting members mounted on the frame, means to rotate the fruit-supporting members, means to move the fruit-supporting members along the frame, and stationarily mounted brushes extending longitudinally above the fruit-supporting members and forming a passage therebetween for the fruit, said brushes being set aslant to the longitudinal axis of the machine so as to guide the fruit toward one side of the machine.

7. A fruit cleaning machine comprising a frame, rotary fruit-supporting members mounted on the frame, means to rotate the fruit-supporting members, means to move the fruit-supporting members along the frame, and brushes extending longitudinally above the fruit-supporting members and arranged in two series, the brushes of one series being set aslant to guide the fruit toward one side of the machine and the brushes of the other series being set aslant to guide the fruit toward the opposite side of the machine.

8. A fruit cleaning machine comprising a frame, rotary fruit-supporting members mounted on the frame, means to rotate the fruit-supporting members, means to move the fruit-supporting members along the frame, and stationarily mounted brushes extending longitudinally above the frut-supporting members and arranged in two series, the brushes of one series being set aslant to guide the fruit toward one side of the machine and the brushes of the other series being set aslant to guide the fruit toward the opposite side of the machine.

9. A fruit cleaning machine comprising a frame, rotary cleaning and fruit-supporting brushes mounted on the frame, means to rotate the brushes, means to move the brushes along the frame, and longitudinally extending brushes above the fruit-supporting brushes set aslant to the longitudinal axis of the machine so as to guide the fruit toward one side of the machine.

10. A fruit cleaning machine comprising a frame, rotary cleaning and fruit-supporting brushes mounted on the frame, means to rotate the brushes, means to move the brushes along the frame, and longitudinally extending stationary brushes above the fruit-supporting brushes set aslant to the longitudinal axis of the machine so as to guide the fruit toward one side of the machine.

11. A fruit cleaning machine comprising a frame, rotary cleaning and fruit-supporting brushes mounted on the frame, means to rotate the brushes, means to move the brushes along the frame, and longitudinally extending brushes arranged in two series above the fruit-supporting brushes, the brushes of one series being set aslant to guide the fruit toward one side of the machine and the brushes of the other series being set aslant to guide the fruit toward the opposite side of the machine.

12. A fruit cleaning machine comprising a frame, rotary cleaning and fruit-supporting brushes mounted on the frame, means to rotate the brushes, means to move the brushes along the frame, and longitudinally extending stationary brushes arranged in two series above the fruit supporting brushes, the brushes of one series being set aslant to guide the fruit toward one side of the machine and the brushes of the other series being set aslant to guide the fruit toward the opposite side of the machine.

13. A fruit cleaning machine comprising a frame, fruit-supporting and conveying means on the frame, and brushes extending longitudinally above the conveying means and forming a passage therebetween for fruit, said brushes being transversely aslant to the vertical and set aslant to the longitudinal axis of the machine to guide the fruit toward one side of the machine.

14. A fruit cleaning machine comprising a frame, fruit-supporting and conveying means on the frame, and stationarily mounted brushes extending longitudinally above the conveying means and forming a passage therebetween for fruit, said brushes being transversely aslant to the vertical and set aslant to the longitudinal axis of the machine to guide the fruit toward one side of the machine.

15. A fruit cleaning machine comprising a frame, fruit-supporting and conveying means on the frame, and brushes extending longitudinally above the conveying means and forming a passage therebetween for fruit and arranged in two series, said brushes being transversely aslant to the vertical and the brushes of one series being set aslant to guide the fruit toward one side of the machine and the brushes of the other series being set aslant to guide the fruit toward the opposite side of the machine.

16. A fruit cleaning machine comprising a frame, fruit supporting and conveying means on the frame, and stationarily mounted brushes extending longitudinally above the conveying means and forming a passage therebetween for fruit and arranged in two series, said brushes being transversely aslant to the vertical and the brushes of one series being set aslant to guide the fruit toward one side of the machine and the brushes of the other series being set aslant to guide the fruit toward the opposite side of the machine.

17. A fruit cleaning machine comprising a frame, rotary fruit supporting members mounted on the frame, means to rotate the fruit-supporting members, means to move the fruit-supporting members along the frame, and brushes extending longitudinally above the fruit-supporting members and forming a passage therebetween for fruit, said brushes being transversely aslant to the vertical.

18. A fruit cleaning machine comprising a frame, rotary fruit-supporting members mounted on the frame, means to rotate the fruit-supporting members, means to move the fruit-supporting members along the frame, and stationarily mounted brushes extending longitudinally above the fruit-supporting members and forming a passage therebetween for fruit, said brushes being transversely aslant to the vertical.

19. A fruit cleaning machine comprising a frame, rotary fruit-supporting members mounted on the frame, means to rotate the fruit-supporting members, means to move the fruit-supporting members along the frame, and brushes extending longitudinally above the fruit-supporting members and forming a passage therebetween for fruit, said brushes being transversely aslant to the vertical and set aslant to the longitudinal axis of the machine to guide the fruit toward one side of the machine.

20. A fruit cleaning machine comprising a frame, rotary fruit-supporting members mounted on the frame, means to rotate the fruit-supporting members, means to move the fruit-supporting members along the frame, and stationarily mounted brushes extending longitudinally above the fruit-supporting members and forming a passage therebetween for fruit, said brushes being transversely aslant to the vertical and set aslant to the longitudinal axis of the machine to guide the fruit toward one side of the machine.

21. A fruit cleaning machine comprising a frame, rotary fruit-supporting members mounted on the frame, means to rotate the fruit-supporting members, means to move the fruit-supporting members along the frame, and brushes extending longitudinally above the fruit-supporting members and forming a passage therebetween for fruit and arranged in two series, said brushes being transversely aslant to the vertical and the brushes of one series being set aslant to guide the fruit toward one side of the machine and the brushes of the other series being set aslant to guide the fruit toward the opposite side of the machine.

22. A fruit cleaning machine comprising a frame, rotary fruit-supporting members mounted on the frame, means to rotate the fruit-supporting members, means to move the fruit-supporting members along the frame, and stationarily mounted brushes extending longitudinally above the fruit-supporting members and forming a passage therebetween for fruit and arranged in two series, said brushes being transversely aslant to the vertical and the brushes of one series being set aslant to guide the fruit toward one side of the machine and the brushes of the other series being set aslant to guide the fruit toward the opposite side of the machine.

23. A fruit cleaning machine comprising a frame, rotary cleaning and fruit-supporting brushes mounted on the frame, means to rotate the brushes, means to move the brushes along the frame, and brushes extending longitudinally above the first named brushes and forming a passage therebetween for fruit, said brushes being transversely aslant to the vertical.

24. A fruit cleaning machine comprising a frame, rotary cleaning and fruit-supporting brushes mounted on the frame, means to rotate the brushes, means to move the brushes along the frame, and stationarily mounted brushes extending longitudinally above the first named brushes and forming a passage therebetween for fruit, said brushes being transversely aslant to the vertical.

25. A fruit cleaning machine comprising a frame, rotary cleaning and fruit-supporting brushes mounted on the frame, means to rotate the brushes, means to move the brushes along the frame, and brushes extending longitudinally above the first named brushes and forming a passage therebetween for fruit, said brushes being transversely aslant to the vertical and set aslant to the longitudinal axis of the machine to guide the fruit toward one side of the machine.

26. A fruit cleaning machine comprising a frame, rotary cleaning and fruit-supporting brushes mounted on the frame, means to rotate the brushes, means to move the brushes along the frame, and stationarily mounted brushes extending longitudinally above the first named brushes and forming a passage therebetween for fruit, said brushes being transversely aslant to the vertical and set aslant to the longitudinal axis of the machine to guide the fruit toward one side of the machine.

27. A fruit cleaning machine comprising a frame, rotary cleaning and fruit-supporting brushes mounted on the frame, means to rotate the brushes, means to move the brushes along the frame, and brushes extending longitudinally above the first named brushes and forming a passage therebetween for fruit and arranged in two series, said brushes being transversely aslant to the vertical and the brushes of one series being set aslant to guide the fruit toward one side of the machine and the brushes of the other series being set aslant to guide the fruit toward the opposite side of the machine.

28. A fruit cleaning machine comprising a frame, rotary cleaning and fruit-supporting brushes mounted on the frame, means to rotate the brushes, means to move the brushes along the frame, and stationarily mounted brushes extending longitudinally above the first named brushes and forming a passage therebetween for fruit and arranged in two series, said brushes being transversely aslant to the vertical and the brushes of one series being set aslant to guide the fruit toward one side of the machine and the brushes of the other series being set aslant to guide the fruit toward the opposite side of the machine.

29. A fruit cleaning machine comprising a frame, rotary fruit-supporting members mounted on the frame, means to rotate the rotary members to turn over and clean the fruit thereon, means to move the rotary members along the frame to convey the fruit, longitudinally extending brushes arranged in two series above the fruit-supporting members forming passages for the fruit, and brushes of one series being set aslant to guide the fruit toward one side of the machine and the brushes of the other series being set aslant to guide the fruit toward the opposite side of the machine, and means to spray a fluid on the fruit while it is upon the fruit-supporting members.

30. A fruit cleaning machine comprising a frame, rotary cleaning and fruit-supporting brushes mounted on the frame, means to rotate the brushes to turn over and clean the fruit thereon, means to move the brushes along the frame to convey the fruit, longitudinally extending brushes arranged in two series above the fruit-supporting members forming passages for the fruit, the brushes of one series being set aslant to guide the fruit toward one side of the machine and the brushes of the other series being set aslant to guide the fruit toward the opposite side of the machine, and means to spray a fluid on the fruit while it is upon the fruit-supporting brushes.

Signed at Los Angeles, California, this 4 day of May, 1918.

FRED STEBLER.

Witnesses:
GEORGE H. HILES,
L. BELLE WEAVER.